Patented June 29, 1954

2,682,532

UNITED STATES PATENT OFFICE 2,682,532

POLYACETAL PREPARATION

Robert L. Adelman, Niagara Falls, N. Y., assignor to E. I. du Pont de Nemours and Company, Wilmington, Del., a corporation of Delaware No Drawing. Application January 27, 1950, Serial No. 140,971

13 Claims. (Cl. 260—91.1)

This invention relates to the production of polyacetals and more particularly to a novel process involving the reaction of certain vinyl ethers with certain hydroxy compounds.

Polyacetals have been prepared by reacting: acetylene with diols (Carothers, J. A. C. S. 51, 2548 (1929)), acetaldehyde with diols and acetals with diols. Vinyl acetate has been reacted in the presence of mercuric sulfate as catalyst with monohydric alcohols to produce acetals and with a diol to produce a cyclic acetal (Croxall, Glavis and Neher, J. A. C. S. 70, 2805 (1498)).

Also, the reaction of vinyl ethers with alcohols in the presence of acid catalysts to form the acetals is well known (Hill, J. A. C. S. 50, 2727 (1928)); but heretofore this reaction has not been adapted to the production of polyacetals.

An object of the invention is a new process for the preparation of polyacetals. Another object is a new process based on the interaction of certain vinyl ethers with glycols or polymeric alcohols. Another object is the provision of a new process for the insolubilization of polymeric alcohols such as polyvinyl alcohol, starch and the like. Another object is a new process for polymerization, using traces of strong acids or mercuric salts of strong acids as catalysts at moderate temperatures. Further objects will appear hereinafter.

The above objects are attained in accordance with the present invention by reacting certain vinyl ethers with certain aliphatic hydroxy compounds in the presence of acidic catalysts at temperatures not lower than about 15° C., preferably within the range of about 20° to 80° C. The products of the reactions are polymeric acetals characterized by insolubility or low solubility in water, some of which are viscous liquids and some solid materials.

One phase of the invention is the reaction of divinyl ethers with certain aliphatic polyhydroxy compounds, namely, glycols and polymeric alcohols. Herein, the term "polymeric alcohols" is used to designate polymeric aliphatic compounds, each molecule of which contains more than 100 carbon atoms and a plurality of alcoholic hydroxyl groups (i. e., hydroxyl groups attached to carbon atoms, which in turn are linked only to carbon or carbon and hydrogen, as distinct from hydroxyl groups which form part of carboxyl, ester or amide groups or their thio analogs). The outstanding examples of the polymeric alcohols are polyvinyl alcohol and its various derivatives such as the various known hydrolyzed or partially hydrolyzed polyvinyl ester polymers and copolymers, partially esterified or acetalized polyvinyl alcohols and the like, starch and the various starch-like materials and starch degradation products such as dextrin, glycogen, soluble starch and the like.

The divinyl ethers which may so react include divinyl ether ($CH_2=CH—O—CH=CH_2$), and the divinyl ethers of the glycols, e. g., the divinyl ethers of ethylene glycol, propylene glycol, butylene glycol, decamethylene glycol and the like, i. e., the divinyl ethers of any glycols containing 2 or more carbon atoms.

The reaction between a divinyl ether of the above described type and a glycol or polyglycol in the presence of an acid catalyst produces polymeric materials, generally highly viscous liquids at room temperature, which I believe may be linear polymers.

Another phase of the invention is the reaction of a monovinyl glycol ether having the formula $CH_2=CH—O—(CH_2)_nOH$, where $n$ is an integer greater than 3 (e. g., the monovinyl ethers of butylene glycol, pentanediol, hexanediol, decamethylene glycol and the like) with itself or with another monovinyl glycol ether of the same definition. Preferably the monovinyl ether will be one in which the value of $n$ in the above formula does not exceed 15. The reaction may be carried out merely by adding a small amount of a strong acid or acid salt to the monovinyl glycol ether, or a mixture of such monovinyl ethers, at a temperature of 15° C. or higher, e. g., at room temperature. The resulting exothermic reaction forms a polymeric acetal similar in properties to the product of reaction between a divinyl ether and a glycol and which also appears to be a linear polyacetal.

The reaction between a divinyl ether and a polymeric alcohol such as a water-soluble polyvinyl alcohol, or a soluble starch or the like produces modified polymeric alcohols which have lowered water solubilities, or are water-insoluble. The polymeric alcohol may be reacted in granular or powdered forms or (as in the case of a polyvinyl alcohol) in sheet or fibre form.

The above described monovinyl glycol ethers likewise may be reacted with the polymeric alcohols, in which case the latter will be insolubilized by acetalization of hydroxy groups. Simultaneously, the monovinyl glycol ethers will react to form the linear polyacetal.

In another mode of practicing my invention, I may form partial vinyl ethers of a polymeric alcohol by applying the method of my copending application Serial No. 139,793, filed January 20, 1950, and now Patent Number 2,579,411 and react the partial vinyl ethers with themselves or with unetherified polymeric alcohols present. The method of the said copending application includes reacting a hydroxy compound such as polyvinyl alcohol with a vinyl ester in the presence of a mercuric salt catalyst, e. g., mercuric sulfate. To utilize such method to produce a polyacetal, I may mix a polyvinyl alcohol, starch or other polymeric alcohol with a vinyl ester (e. g., vinyl acetate) and add the mercuric salt catalyst and a small amount of a strong mineral acid or acidic salt, at a temperature of 15° C. or higher, e. g., 20 to 30° C. Alternatively, I may first react the vinyl ester with the polymeric alcohol to produce a partial vinyl ether thereof and then add the mineral acid catalyst. The product is an acetalized polymeric alcohol having little or no solubility in water. The invention is further illustrated by the following examples:

Example 1

Three g. (0.02 mole) of the divinyl ether of 1,5-pentanediol was mixed with 2 g. (0.2 mole) of 1,5-pentanediol. No reaction occurred until the addition of a trace of sulfuric acid. Addition of the acid caused considerable heat evolution, with the formation in a few minutes of a colorless very viscous, liquid polymer. That the polymer was a polyacetal, was demonstrated by the evolution of acetaldehyde on heating it with dilute aqueous hydrochloric acid. Similar results were obtained by reacting 1,5-pentanediol (a) with the divinyl ether of 1,4-butanediol and (b) with the divinyl ether of ethylene glycol. Hydrochloric acid, ammonium chloride and mercuric sulfate were found to be suitable catalysts for these reactions. With the acidic salts as catalysts, the reactions proceeded more slowly than with the free acids.

Example 2

To 2.6 g. (0.02 mole) of the monovinyl ether of 1,5-pentanediol was added a trace of concentrated sulfuric acid. After a few seconds, an exotherm set in with the formation of a colorless viscous liquid polymer which was complete within a few minutes. The polymer was found to be a polyacetal as in Example 1. It was soluble in benzene, dioxane, insoluble in water and incompatible with polyvinyl chloride ("Geon" #101).

Example 3

The procedure of Example 2 was repeated, except that 0.01 g. of mercuric sulfate was used as the catalyst. The reaction was considerably slower, and required 24 hours at 30° C. to reach approximately the same viscosity as the product of Example 2.

Example 4

The addition of acid to pure divinyl ether of 1,4-butanediol produced no reaction. The same result occurred on adding acid to pure vinyl butyl ether.

Example 5

Water-soluble starch was converted to a water-insoluble form by mixing it with a benzene solution of divinyl ether containing a trace of hydrochloric acid.

Example 6

One g. samples of water-soluble starch and a water-soluble polyvinyl alcohol (Elchem 71—24) were placed in test tubes, to each of which were added 5 ml. of the divinyl ether of 1,5-pentanediol and 0.01 ml. of conc. hydrochloric acid at 25° C. The mixtures were well shaken for 5 minutes and allowed to stand with occasional shaking for 96 hours at 25° C. The divinyl ether was decanted and the residues washed with benzene and ligroin. After drying at 90° C. for 5 min., the polymeric products were very insoluble in hot or cold water and with swelling of less than 10%. Control samples, in which benzene was substituted for the divinyl ether, were completely dispersible in water. Mercuric sulfate and ammonium chloride also were catalysts for this reaction, but were not as effective in rate of insolubilization as the free mineral acids.

Example 7

Films of polyvinyl alcohol were also insolubilized by immersing the film at 25°–90° C. in a solution composed of 0.1–1% hydrochloric acid dissolved in the divinyl ether of 1,5-pentanediol. By varying the immersion time from 2 minutes to 2 hours, different degrees of insolubilization were obtained. Similar results were obtained by this procedure, using ammonium chloride in place of hydrochloric acid as catalyst.

Example 8

Vinyl ethers of starch and PVA were also prepared in situ by adding the polymer to a solution of 0.1%–10% mercuric sulfate in vinyl acetate. As described in patent application Serial No. 139,793, filed January 20, 1950, and issued as U. S. P. 2,579,411, a vinyl interchange occurs between the vinyl ester and the alcohol with the formation of the vinyl ether of the alcohol and acetic acid. Under the conditions of this work, however (long reaction periods at the relatively elevated temperatures of 25–90° C.), further reaction occurs rapidly with the formation of cyclic and cross-linked polyacetals and decreased solubility in aqueous solvents. An example is given below:

One g. samples of water-soluble starch and water-soluble PVA (Elchem 71-24) were vigorously shaken with a solution of 5 ml. of vinyl acetate, 0.01 g. mercuric sulfate and 0.001 g. copper resinate. The mixture was then allowed to stand for 96 hours at 25° C. with intermittent shaking. The resulting polymers, worked up as in Example 3 were over 60% considerably insoluble in water.

For a reaction of the type illustrated by Example 1 any divinyl ether of a diol may be used such as the divinyl ethers of ethylene glycol, propylene glycol, trimethylene glycol, monochloroglycerol, 1,5-pentanediol and the like. Any such divinyl ether may be reacted with any of the above-mentioned diols. Also, divinyl ether (CH$_2$=CH—O—CH=CH$_2$) may be reacted with any diol to produce the polyacetals.

For a reaction of the type illustrated by Example 3, monovinyl ethers of any diol in which the hydroxyl groups are more than 3 carbon atoms apart may be homopolymerized by traces of mineral acids or corresponding acidic salts. Monovinyl ethers of ethylene glycol or propylene glycol do not thus polymerize, but form low molecular weight cyclic acetals in the presence of a strong acid.

For a reaction of the type illustrated by Example 5, the divinyl ether of any diol may be used. The polyalcohol used may be of the type of starch, polyvinyl alcohol, partially hydrolyzed polyvinyl esters such as partially hydrolyzed polyvinyl alcohols, partially acetalized polyvinyl alcohols (e. g., polyvinyl butyrals), etc. (glycerol, sugars)

hydrolyzed vinyl ester copolymers and the like, as well as ethylene glycol and other diols.

For a reaction of the type illustrated by Example 8, vinyl ethers of the hydroxylated polymers may be prepared by reacting any vinyl ester, such as vinyl acetate, propionate, benzoate, caprylate or laurate, or divinyl esters such as divinyl adipate, with starch, polyvinyl alcohol, etc.

The catalysts used in this invention are strong mineral acids, such as sulfuric acid, hydrochloric or phosphoric acids or the salt of a strong acid and a weak base (acidic salt), such as ammonium chloride or mercuric sulfate. Acid concentrations of 0.01 to 5% by weight are suitable. For reactions involving the formation of vinyl ethers by reaction of a hydroxy compound with a vinyl ester, as in Example 8 a mercuric salt of a strong acid, such as mercuric sulfate, mercuric phosphate or mercuric oxide-boron fluoride complex (in concentration of 0.2–5%) is also necessary. Throughout the present specification and in the appended claims, the term "strong acid" is used to designate a mineral acid having an acid strength at least that of phosphoric acid. The mercuric catalyst causes the vinyl ester to react with the polyalcohol to form partial vinyl ethers, as described in my copending application Serial No. 139,793. The resulting mixture of vinyl ethers and hydroxy compounds then reacts to form complex, high molecular weight polyacetals, by either cross linking with another polymer chain or by internal cyclization.

The ratio of reactants for reaction illustrated by Example 1 will help determine the degree of polymerization. Thus, an excess of diol will serve as a chain transfer agent by acetal-alcohol interchange and will tend to give lower molecular weight products than with an excess of divinyl ether.

As reactions between polymeric alcohols and vinyl ethers occur only at the surface of the polymer, it is usually preferable to disperse the polymer in finely divided form in an excess of the vinyl compound with good surface to liquid contact, to encourage efficiency of reaction. Inert solvents for the divinyl ether, such as benzene or ligroin, may also be used, but with somewhat decreased reaction velocity.

Higher temperatures, up to reflux temperatures of the reaction components will considerably increase the speed of reaction but may often lead to discolored or otherwise inferior products. The range of 20° C.–100° C. is satisfactory for most combinations. Temperatures below 15° C. generally are too slow to be practicable.

The herein described invention provides a process for the preparation of polyacetals, including a new type of polyacetal, which are useful as additives to solvents, plasticizers and lubricating oils. It also provides new processes for the insolubilization of polymeric alcohols which are useful in the adhesive, coating, film and artificial fiber industries.

I claim:

1. The process for the production of a polymeric acetal which comprises reacting a member of the group consisting of divinyl ether and glycol divinyl ethers with a hydroxy compound selected from the group consisting of glycols and polymeric aliphatic compounds each molecule of which contains more than 100 carbon atoms and a plurality of alcoholic hydroxyl groups attached to carbon atoms which in turn are linked to carbon, any other atoms attached to such hydroxyl bearing carbon atoms being hydrogen, in the presence of about 0.01 to 5% by weight of an acidic material selected from the group consisting of strong mineral acids and acidic salts thereof at a temperature not lower than about 15° C.

2. The process for the production of a polymeric acetal which comprises reacting a glycol divinyl ether with a hydroxy compound selected from the group consisting of glycols and polymeric aliphatic compounds each molecule of which contains more than 100 carbon atoms and a plurality of alcoholic hydroxyl groups attached to carbon atoms which in turn are linked to carbon, any other atoms attached to such hydroxyl bearing carbon atoms being hydrogen, in the presence of a small but effective amount of a catalyst selected from the group consisting of strong mineral acids and acidic salts thereof at a temperature not lower than 15° C.

3. The process for the production of a polymeric acetal which comprises reacting a glycol divinyl ether with a hydroxy compound selected from the group consisting of glycols and polymeric aliphatic compounds, each molecule of which contains more than 100 carbon atoms and a plurality of alcoholic hydroxyl groups attached to carbon atoms which in turn are linked to carbon, any other atoms attached to such hydroxyl bearing carbon atoms being hydrogen, in the presence of about 0.01 to 5% by weight of an acidic material selected from the group consisting of strong mineral acids and acidic salts of said acids at a temperature not lower than about 15° C.

4. The process of claim 3 in which said glycol divinyl ether is the divinyl ether of ethylene glycol.

5. The process which comprises reacting water-soluble polyvinyl alcohol with the divinyl ether of a glycol in the presence of a small but catalytically effective quantity of a member of the group consisting of strong mineral acids and acid salts thereof at a temperature not lower than about 15° C.

6. The process of rendering insoluble water-soluble polyvinyl alcohol which comprises treating said polyvinyl alcohol with the divinyl ether of 1,5-pentanediol in the presence of a small but catalytically effective quantity of a member of the group consisting of strong mineral acids and acidic salts thereof.

7. The process which comprises reacting water-soluble starch with the divinyl ether of a glycol in the presence of about 0.01 to 5% by weight of a strong mineral acid at a temperature not lower than about 15° C.

8. The process which comprises reacting water-soluble starch with the divinyl ether of a glycol in the presence of a small but catalytically effective quantity of a member of the group consisting of strong mineral acids and acidic salts thereof at a temperature not lower than about 15° C.

9. The process of rendering insoluble water-soluble starch which comprises treating said starch with the divinyl ether of 1,5-pentanediol in the presence of a small but catalytically effective quantity of a member of the group consisting of strong mineral acids and acidic salts thereof.

10. The process for the production of a polymeric acetal which comprises reacting the divinyl ether of 1,5-pentanediol with 1,5-pentanediol in the presence of 0.01 to 5% by weight of a strong mineral acid at a temperature not lower than about 15° C.

11. The process for the production of a polymeric acetal which comprises reacting the divinyl ether of 1,4-butanediol with 1,5-pentanediol in the presence of 0.01 to 5% by weight of a strong mineral acid at a temperature not lower than about 15° C.

12. The process for the production of a polymeric acetal which comprises reacting a glycol divinyl ether with a glycol in the presence of about 0.01 to 5% by weight of an acidic material selected from the group consisting of strong mineral acids and acidic salts of said acids at a temperature not lower than about 15° C.

13. The process which comprises reacting water-soluble polyvinyl alcohol with the divinyl ether of a glycol in the presence of 0.01 to 5% by weight of a strong mineral acid at a temperature not lower than about 15° C.

References Cited in the file of this patent

UNITED STATES PATENTS

| Number | Name | Date |
|---|---|---|
| 2,000,252 | Reppe et al. | May 7, 1935 |
| 2,071,252 | Carothers | Feb. 16, 1937 |
| 2,104,002 | Reppe et al. | Dec. 28, 1937 |
| 2,110,499 | Carothers | Mar. 8, 1938 |
| 2,447,975 | Croxall et al. | Aug. 24, 1948 |
| 2,448,660 | Croxall et al. | Sept. 7, 1948 |
| 2,505,366 | Schoene | Apr. 25, 1950 |